United States Patent [19]

Showalter

[11] 3,995,780
[45] Dec. 7, 1976

[54] PRESSURE-RESPONSIVE VALVE MECHANISM

[75] Inventor: William E. Showalter, Seal Beach, Calif.

[73] Assignee: Union Oil Company of California, Brea, Calif.

[22] Filed: Oct. 23, 1975

[21] Appl. No.: 625,127

[52] U.S. Cl. .............................. 222/494; 222/529
[51] Int. Cl.[2] ...................................... B65D 45/32
[58] Field of Search .......... 222/527, 528, 529, 503, 222/493, 494, 103, 463, 496; 251/9; 138/45, 46

[56] References Cited

UNITED STATES PATENTS

| 2,378,061 | 6/1945 | Buhler et al. | 222/494 |
| 2,555,490 | 6/1951 | Horn | 222/494 X |
| 3,532,255 | 10/1970 | Norris et al. | 251/9 X |

*Primary Examiner*—Stanley H. Tollberg
*Attorney, Agent, or Firm*—Richard C. Hartman; Dean Sandford; John E. Vanderburgh

[57] ABSTRACT

A pressure-responsive valve mechanism for discharging a slurry of reduced fluid content from the bottom of a solids-liquid separator. The valve mechanism includes (1) an inlet duct for receiving the slurry, (2) an outlet duct which extends below the inlet duct and which is free to move in an axial direction in response to an increase or a decrease in the downward force imparted to it by the slurry, (3) a constrictable nozzle attached to the lower terminus of the outlet duct, (4) a seal to provide a fluid-tight seal between the inlet duct and the outlet duct, and adapted to allow the outlet duct to move in an axial direction relative to the inlet duct, and (5) a lever mechanism mechanically actuated by the axial movement of the outlet duct to increase the constriction of the nozzle in response to an upward movement of the outlet duct and decrease the constriction of the nozzle in response to a downward movement of the outlet duct.

8 Claims, 1 Drawing Figure

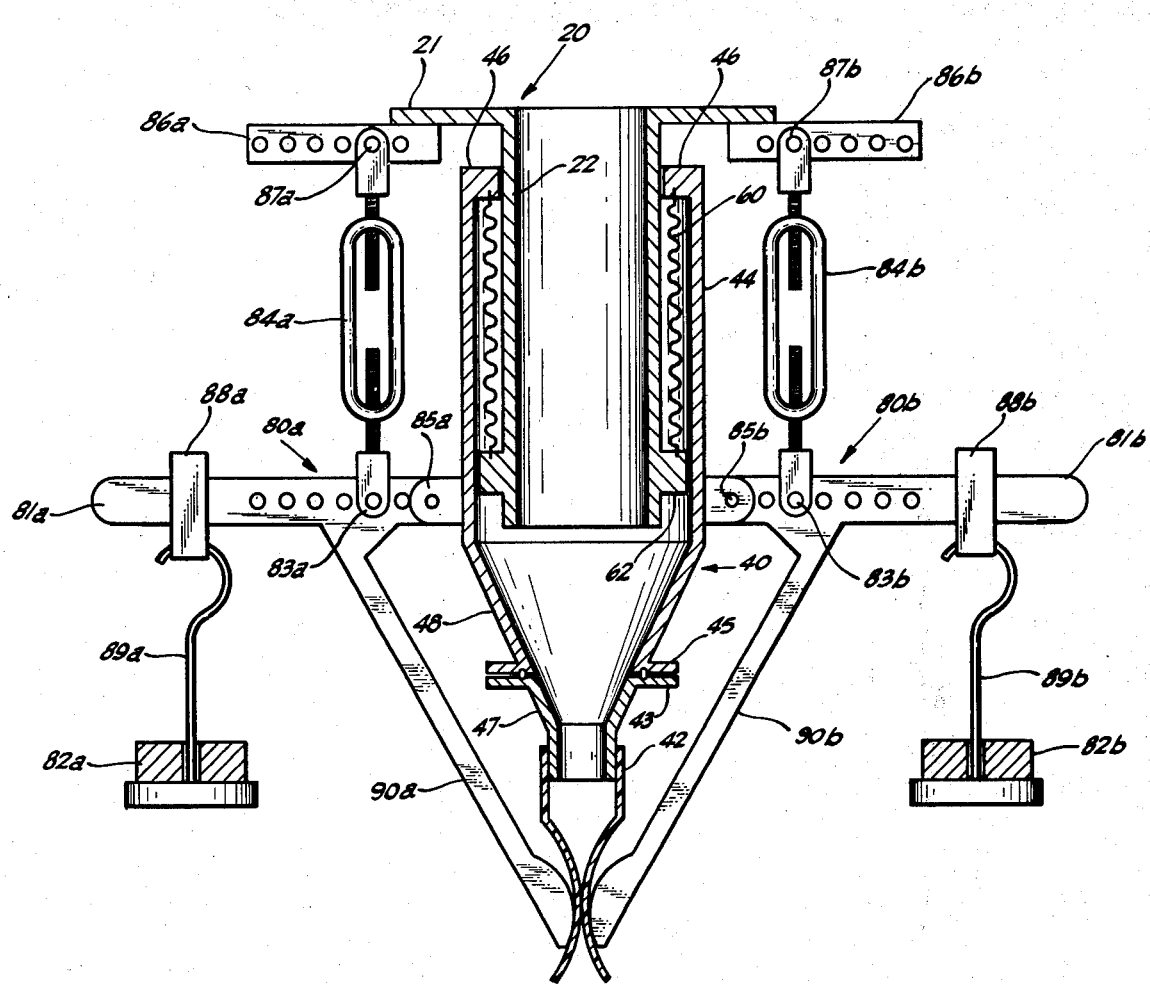

PRESSURE-RESPONSIVE VALVE MECHANISM

BACKGROUND OF THE INVENTION

1. Field of the Invention

This invention relates to valves for automatically controlling the discharge of a slurry from the bottom of a solids-liquid separator, and more particularly to a pressure-responsive valve mechanism useful in reducing the fluid content of a slurry which is discharged from the bottom of a solids-liquid separator.

2. Description of the Prior Art

In many solids-processing operations, it is necessary to separate a solid material from a liquid, either to remove a solid contaminant from the liquid or to recover a solid product. In either case, a preliminary separation is often made by allowing the solids material to settle in a solids-liquid separator, and discharging a solid-liquid slurry of reduced fluid content from the bottom of the separator. It is the desire of the operator to discharge the solids from the separator accompanied by as little of the liquid as possible. For example, in the hot water-diluent processing of tar sand, the mined tar sand is placed in a pulper with hot water, surfactants, and a high API-gravity hydrocarbon diluent. The pulper, by stirring and agitation, converts the gross mixture into a slurry wherein the tar and other hydrocarbons are removed from the surface of the sand. This slurry is then conducted to a solids-liquid separator for separation of the sand and other dense particulate matter which settle to the bottom, and an oil-water emulsion is withdrawn from the top of the separator and conducted to a thickener for further processing. It obviously is desirable to discharge the solids with as little of the valuable oil-water emulsion as possible. Ideally, the solids would be fully compacted and would contain only one pore volume of fluid, which in the case of a sand-water slurry would be about 40 volume percent water, i.e., about 20 weight percent water. However, this degree of separation is not readily attainable by this method and a more realistic goal in the case of a sand-water slurry would be the discharge of a slurry containing no more than about 50 volume percent water.

Past attempts to reduce the field content of a slurry discharged from the bottom of a solids-liquid separator have employed such complex devices as a motor-driven star valve whose rotation varied with the attenuation of a radiation beam passing through the bottom of the separator. The attenuation of the beam was measured by a Geiger counter, whereby the greater the density of the slurry, the greater the attenuation of the radiation beam. This particular system resulted in abrupt on-off flow, thus not providing a smooth, continuous flow of a reduced fluid-content slurry. This system, as well as others, is also complex, difficult to adjust, and requires an external source of power.

Thus there is a need for a simple, yet easily adjustable valve capable of discharging a reduced fluid-content slurry from the bottom of a solids-liquid separator, and particularly for one which does not provide abrupt on-off flow or require an external source of power.

Accordingly, a principal object of this invention is to provide a simple, efficient, and easily adjustable device for discharging a reduced fluid-content slurry.

Another object of the invention is to provide a device that functions automatically to reduce the fluid content of a slurry discharged from the bottom of a solids-liquid separator.

Still another object of this invention is to provide a device having a discharge capacity that varies inversely with the fluid content of the slurry, thereby avoiding abrupt on-off flow.

Yet another object of this invention is to provide a pressure-responsive device that functions automatically to reduce the fluid content of a slurry and which does not require an external source of power.

Further objects and advantages of this invention will become apparent to those skilled in the art from the following description.

SUMMARY OF THE INVENTION

Briefly, this invention is a valve mechanism useful in discharging a slurry of reduced fluid content from the bottom of a solids-liquid separator, and broadly includes (1) an inlet duct for receiving the slurry which settles to the bottom of the separator and which duct is adapted for attachment thereto; (2) an outlet duct below the inlet duct, which outlet duct is movable in an axial direction in response to an increase or a decrease in the downward force imparted to it by the slurry; (3) a constrictable nozzle attached to the lower terminus of the outlet duct; (4) a seal to provide a fluid-tight seal between the inlet duct and the outlet duct, and which is adapted to allow the outlet duct to move in an axial direction relative to the inlet duct; and (5) a lever mechanism for constricting the nozzle in response to axial movement of the outlet duct, so that the constriction of the nozzle is increased in response to an upward movement of the outlet duct and decreased in response to a downward movement of the outlet duct.

The lever mechanism of this invention is adjustable so that the nozzle can be completely constricted when the slurry contained in the outlet duct has a high fluid-content, reflected by the small downward force imparted to the outlet duct. As more dense, particulate material settles to the bottom of the separator, passes through the inlet duct, and collects in the outlet duct, the fluid content of the slurry decreases and the downward force imparted to the outlet duct increases. The lever mechanism is adjusted so that the completely constricted nozzle will open when a selected minimum force is imparted to the outlet duct, and the constriction of the nozzle will continue to be reduced as the density of the slurry increases and imparts a greater force to the outlet duct. When the density of the slurry decreases, reflecting an increase in the fluid content, the downward force imparted to the outlet duct decreases and the constriction of the nozzle increases to thereby reduce the rate of discharge of the higher fluid-content slurry. It is this varying constriction of the nozzle which allows for the discharge of a reduced fluid-content slurry and which avoids the abrupt on-off flow associated with valves heretofore used.

BRIEF DESCRIPTION OF THE DRAWING

The drawing is a side elevational view, partly in cross-section, of a preferred embodiment of the pressure-responsive valve of this invention.

DETAILED DESCRIPTION OF THE INVENTION

Now, describing the invention in detail, the inlet duct is constructed to be attached to the bottom of a solids-liquid separator and adapted to receive the slurry which settles and collects at the bottom of the separator. It is preferred that the inlet duct and the separator be connected by a pair of flanges extending from the top of the inlet duct and from a nozzle at the bottom of the separator.

Below the inlet duct is the outlet duct, which is so constructed and arranged that it receives the downward force of the slurry which is contained within and above the valve. It is preferred that the outlet duct be allowed to move only in an axial direction, along the flow path of the slurry. Attached to the lower terminus of the outlet duct is a constrictable nozzle which is preferably a flexible hose made of rubber or the like, and which can be constricted by pinching. The hose must be able to withstand repeated pinching and also the considerable abrasion expected from the flow of abrasive slurry. It is preferred that the lower portion of the outlet duct be tapered, such as in the shape of a funnel or truncated cone. This will enable the outlet duct to receive the downward force of the slurry as well as smoothly direct the slurry to the constrictable nozzle.

A fluid-tight seal is provided between the inlet duct and the outlet duct, and this seal is so constructed and adapted to allow the outlet duct to freely move upwardly or downwardly relative to the inlet duct in response to the changes in the force that the slurry imparts to it. A conventional-type seal, such as an O-ring, packed-gland, or the like, can be used. An especially suitable seal is an axially flexible cylindrical member, exemplified by a metal bellows, such as those marketed by the Fulton Sylphon Division of Robertshaw Controls Co. It is preferred that the axially flexible cylindrical member be resistant to transverse forces of expansion and compression.

Attached to the outlet duct is a lever mechanism which is constructed and adapted to increase the constriction of the nozzle when the downward force imparted to the outlet duct by the slurry decreases, and to decrease the constriction of the nozzle when the downward force of the slurry increases. The lever mechanism broadly includes a lever and a pincher arm; and the valve of this invention may have one or more such mechanisms, although two lever mechanisms are preferred.

The lever mechanism is actuated mechanically by the attachment of a lever arm to the outlet duct which arm responds to the axial movement of the outlet duct. The lever arm has a fulcrum which is supported by connection to the stationary inlet duct. The lever arm is subjected to a variable force supplied by the outlet duct, which force is dependent upon the force imparted to the outlet duct by the slurry, and a biasing means which can be supplied by a weight, springs, or the like, appropriately directed and positioned on the opposite or same side of the fulcrum. A pincher arm is rigidly attached to the lever arm, and extends from the lever arm to the constrictable nozzle below the outlet duct. The end of the pincher arm is so formed and constructed that it can, in cooperation with one or more other pincher arms, or with a rigid plate attached to the outlet duct, vary the constriction of the nozzle from fully open to fully closed, in response to the axial movement of the outlet duct.

Referring now to the drawing, there is shown inlet duct 20 having flange 21 adapted for attachment to the bottom of a solids-liquid separator, not shown, and cylindrical portion 22 which directs the slurry to the outlet duct. It is preferred to provide the bottom of the separator with a gate valve to close the separator during the replacement or removal of the pressure-responsive valve, and which also provides a positive closing means during normal operation. Also shown are outlet duct 40, bellows 60, and lever mechanisms 80a and 80b. Bellows 60 and outlet duct 40 are connected to inlet duct 20 by means of outer flange 62 which extends around inlet duct 20, near the bottom thereof. This outer flange may be provided by an internally threaded ring which threadably engages external threads along the lower portion of inlet duct 20. Bellows 60 is fluid-tightly attached to outer flange 62 and extends upwardly around the exterior of cylindrical portion 22 of inlet duct 20. Outlet duct 40 has an upper sleeve segment 44 which encompasses both bellows 60 and cylindrical portion 22 of inlet duct 20. This upper sleeve segment 44 terminates with an inner flange 46 which is adapted to fluid-tightly attach to the top of bellows 60.

Bellows 60, inner flange 46, sleeve portion 44, and outer flange 62 are so constructed that outlet duct 40 can move axially in close alignment with the cylindrical portion 22 of inlet duct 20. Bellows 60 provides a frictionless seal between inlet duct 20 and outlet duct 40, which is conveniently guided along cylindrical portion 22 by outer flange 62 and inner flange 46. Because of the fluid-tight attachment of the bellows, the contact between cylindrical portion 22 of inlet duct 20 and inner flange 46, and the contact between outer flange 62 and sleeve portion 44 of outlet duct 40 need not provide a fluid-tight seal. It is actually preferred that a small clearance be provided at these points of relative motion so as to prevent excessive wear and reduce friction. It is also preferred that a substantial portion of cylindrical portion 22 of inlet duct 20 extend below outer flange 62, so as to prevent the solids that collect in the outlet duct from creeping up the annulus formed by sleeve portion 44 and cylindrical portion 22.

Below the sleeve portion 44, outlet duct 40 also has a truncated cone portion 48 and a removable tip 47. The removable tip is attached to truncated cone portion 48 by means of a pair of flanges 45 and 43. This allows for quick replacement of constrictable nozzle 42. Constrictable nozzle 42 is a short, resilient member such as a short length of hose made of rubber, neoprene, or the like, and is attached to the lower terminus of outlet duct 40. It is preferred that the material selected be resistant to abrasion and that it be capable of withstanding continual pinching. Constrictable nozzle 42 is shown as tightly enveloping removable tip 47 of outlet duct 40; however other expedient means of attaching the hose to tip 47 can be employed.

Also attached to outlet duct 40 are lever mechanisms 80a and 80b, which through the vertical movement of the outlet duct, control the degree of constriction of nozzle 42. In this embodiment there are two lever mechanisms located in an opposed position, on opposite sides of the outlet duct. Lever arms 81a and 81b are pivotally attached at pins 85a and 85b, respectively, at the outside of outlet duct 40 so that they can rotate in the vertical plane about pins 85a and 85b. Fulcrums 83a and 83b of lever arms 81a and 81b are located at an intermediate point along the lever arms and are pivotally supported from above by support members 84a and 84b. Support members 84a and 84b, which are adjustable, and can conveniently be turnbuckles, are pivotally connected at pins 87a and 87b, respectively, which are attached to supports 86a and 86b, which in turn are fixedly attached to inlet duct 20. This arrangement allows fulcrums 83a and 83b to rotate in an arc about pins 87a and 87b as pins 85a and 85b move upwardly or downwardly. Located on the outside end of lever arms 81a and 81b are sliding members 88a and 88b having attached thereto weight supports 89a and 89b which hold weights 82a and 82b. Sliding members 88a and 88b are slidably mounted on lever arms 81a and 81b so as to be movable to selected positions to adjust the force necessary to move the outlet duct downwardly in opposition to the counter force supplied by weights 82a and 82b. Weight supports 89a and 89b are constructed to accommodate the placement of varying amounts of weight. By the proper positioning of sliding members 88a and 88b, and/or the placement of the proper amount of weight on weight supports 89a and 89b, the necessary adjustment of the lever mechanisms can easily be effected.

Fixedly attached to lever arms 81a and 81b are pincher arm 90a and 90b which are elongated members extending from the lever arms to constrictable nozzle 42. The two pincher arms, 90a and 90b, are so constructed that they cooperate in completely constricting nozzle 42 when the downward force imparted to outlet duct 40 is not sufficient to overcome the counterbalancing force, thereby causing an upward movement of outlet duct 40. The end or pinching portion of the pinching arms are suitably shaped to provide a smooth but firm constriction of the nozzle 42.

Another method of adjusting the valve shown in the drawing is to reposition support members 84a and 84b either inwardly or outwardly, along supports 86a and 86b and lever arms 81a and 81b at the various positions illustrated in the drawing. This will have the effect of changing the length of the two portions of the lever arms on each side of the fulcrums, thereby altering the force necessary to move the outlet duct and changing the sensitivity of the pincher arms to a vertical movement of the outlet duct. It should be pointed out that for ideal operation the liquid level above the valve should be maintained constant so that any variation in the downward pressure imparted to the outlet duct is solely the result of a change in the fluid content of the slurry contained in the valve.

Various embodiments and modifications of this invention have been described in the foregoing description, and further modifications will be apparent to those skilled in the art. Such modifications are included within the scope of this invention as defined by the following claims.

Having now described the invention, I claim:

1. A valve for discharging a slurry of reduced fluid content from the bottom of a solids-liquid separator comprising:
    an outlet duct in communication with the interior of said solids-liquid separator and having a discharge tip for the discharge of said slurry from said separator, said duct being axially movable with respect to said separator in response to a force imparted thereto by the collection of said slurry therein;
    a constrictable nozzle at said discharge tip of said outlet duct; and
    external flow control means for variably constricting said nozzle responsive to the axial movement of said outlet duct thereby to control the rate of flow of slurry through said nozzle, said flow control means including biasing means for imparting a force to urge said flow control means into a nozzle constricting position.

2. The valve defined in claim 1 wherein said constricting means completely constricts said nozzle when less than a predetermined downward force is imparted to the outlet duct so that high fluid-content slurry is prevented from flowing through said valve.

3. The valve defined in claim 1 wherein said constricting means is connected to said outlet duct and is mechanically actuated by the axial movement of the outlet duct.

4. A pressure-responsive valve mechanism for discharging a slurry of reduced fluid content from the bottom of a solids-liquid separator comprising:
    an inlet duct for receiving said slurry;
    an outlet duct extending below said inlet duct, constructed and adapted to move upwardly or downwardly in response to a decrease or increase, respectively, in the downward force imparted to the outlet duct by the slurry;
    a constrictable nozzle attached to the lower terminus of the outlet duct;
    sealing means for providing a fluid-tight seal between the inlet duct and the outlet duct to prevent the escape of fluid from said valve mechanism except through said constrictable nozzle, and for allowing the outlet duct to move in an axial direction relative to the inlet duct; and
    two lever mechanisms each having a lever arm pivotally attached to said outlet duct, a fulcrum at an intermediate location along said arm, a biasing means to counter the force imparted to the lever arm by the outlet duct, and a pincher fixedly attached to said lever arm and being constructed and adapted to constrict said nozzle in an amount dependent upon the vertical position of the outlet duct, so that an upward movement of the outlet duct increases the constriction and a downward movement of the outlet duct reduces the constriction.

5. The valve mechanism defined in claim 4 wherein said biasing means is adjusted so that the two lever mechanisms completely constrict said nozzle when less than a predetermined downward force is imparted to said outlet duct, whereby high fluid-content slurry is prevented from flowing through said valve.

6. The valve mechanism defined in claim 4 wherein said sealing means is an axially flexible cylindrical member which fluid-tightly connects said inlet duct with said outlet duct.

7. The valve mechanism defined in claim 6 wherein said inlet duct includes a cylindrical portion extending axially into said valve, said axially flexible cylindrical member is fluid-tightly attached to the bottom of said inlet duct and extends upwardly to surround the cylindrical portion of said inlet duct, and wherein said outlet duct includes an upper sleeve segment which surrounds both said axially-flexible cylindrical member and said cylindrical portion of said inlet duct and which is fluid-tightly attached to the top of said axially flexible cylindrical member.

8. A valve for discharging a slurry of reduced fluid content from the bottom of a solids-liquid separator comprising:
    an inlet duct for receiving said slurry, said inlet duct having an outer flange at the top thereof for attachment to the bottom of a solids-liquid separator, a cylindrical section extending into the valve for conducting the slurry to the outlet duct, and having an outer guiding flange near the bottom of said cylindrical section;

an outlet duct extending below said inlet duct, said outlet duct being movable in an axial direction in response to an increase or a decrease in the downward force imparted to it by the slurry, said outlet duct having an upper sleeve portion which substantially surrounds the cylindrical portion of the inlet duct and which terminates at its upper end in an inner guiding flange and which terminates at its lower end in a lower downwardly directed truncated cone section;

a bellows fluid-tightly attached to the outer guiding flange of the inlet duct and extending upwardly and around the inlet duct and being fluid-tightly attached to the inner guiding flange of the outlet duct, said bellows allowing the outlet duct to move in an axial direction relative to the inlet duct and to be guided in its movement by said outer guiding flange and said inner guiding flange;

a constrictable nozzle attached to the lower terminus of the outlet duct; and two lever mechanisms, located on opposite sides of the outlet duct, each mechanism comprising a lever arm pivotally attached to said outlet duct, a fulcrum at an intermediate location along said lever arm, said fulcrum being able to rotate in an arc about a fixed point located above said lever arm, a weight-biasing means to counter the force imparted to the lever arm by the outlet duct, and a pincher fixedly attached to said lever arm and being constructed and adapted to constrict said nozzle in an amount dependent upon the vertical position of the outlet duct, so that an upward movement of the outlet duct increases the constriction of the nozzle and a downward movement of the outlet duct reduces the constriction of the nozzle.

* * * * *